United States Patent
Rodriguez Bravo et al.

(10) Patent No.: US 11,558,390 B2
(45) Date of Patent: Jan. 17, 2023

(54) SYSTEM TO CONTROL ACCESS TO WEB RESOURCES BASED ON AN INTERNET OF THINGS AUTHORIZATION MECHANISM

(71) Applicant: INTERNATIONAL BUSINESS MACHINES CORPORATION, Armonk, NY (US)

(72) Inventors: Cesar Augusto Rodriguez Bravo, Alajuela (CR); David Jaramillo, Durham, NC (US); Peeyush Jaiswal, Boca Raton, FL (US); Priyansh Jaiswal, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 16/918,176

(22) Filed: Jul. 1, 2020

(65) Prior Publication Data
US 2022/0006812 A1   Jan. 6, 2022

(51) Int. Cl.
*H04L 9/40* (2022.01)
*G16Y 40/35* (2020.01)

(52) U.S. Cl.
CPC .......... *H04L 63/102* (2013.01); *G16Y 40/35* (2020.01); *H04L 63/0853* (2013.01); *H04L 63/101* (2013.01); *H04L 63/105* (2013.01); *H04L 63/107* (2013.01)

(58) Field of Classification Search
CPC ... H04L 63/107; H04L 63/08; H04L 63/0853; H04L 63/0492; H04L 63/102; H04L 63/105; H04W 12/64; H04W 12/08; H04W 12/63
See application file for complete search history.

(56) References Cited

U.S. PATENT DOCUMENTS

| 8,625,796 | B1* | 1/2014 | Ben Ayed | H04W 12/64 380/258 |
| 8,761,809 | B2* | 6/2014 | Faith | G06Q 20/389 455/406 |
| 9,185,117 | B2* | 11/2015 | Grigg | H04W 12/06 |
| 9,762,556 | B2 | 9/2017 | James et al. | |

(Continued)

FOREIGN PATENT DOCUMENTS

EP   3211865 A1   8/2017

OTHER PUBLICATIONS

R. F. Olanrewaju, B. U. I. Khan, M. A. Morshidi, F. Anwar and M. L. B. M. Kiah, "A Frictionless and Secure User Authentication in Web-Based Premium Applications," in IEEE Access, vol. 9, pp. 129240-129255, 2021. (Year: 2021).*

(Continued)

*Primary Examiner* — Kari L Schmidt
(74) *Attorney, Agent, or Firm* — Robert D. Bean

(57) ABSTRACT

According to one embodiment, a method, computer system, and computer program product for managing access to one or more protected web resources based on the location of an approver is provided. The present invention may include granting the requestor access to the protected web resource based on one or more access requirements being met, wherein at least one access requirement comprises a location of one or more authorization devices corresponding with one or more approvers being within a threshold distance of a computing device of a requestor requesting a protected web resource.

14 Claims, 5 Drawing Sheets

(56) References Cited

U.S. PATENT DOCUMENTS

| | | | |
|---|---|---|---|
| 9,779,271 B2* | 10/2017 | Kanakarajan | H04W 12/126 |
| 10,212,588 B2* | 2/2019 | Grim | H04W 12/06 |
| 10,269,017 B1* | 4/2019 | Phillips | G06Q 20/3224 |
| 10,313,358 B2* | 6/2019 | Jacobs | H04W 12/06 |
| 10,659,453 B2* | 5/2020 | Huang | H04L 63/18 |
| 10,771,458 B1* | 9/2020 | Xia | H04W 4/02 |
| 10,855,664 B1* | 12/2020 | Ziraknejad | H04W 4/021 |
| 11,030,835 B2* | 6/2021 | Martin | G07C 9/28 |
| 11,178,156 B2* | 11/2021 | Pegg | H04L 63/0876 |
| 2005/0102407 A1 | 5/2005 | Clapper | |
| 2009/0254975 A1* | 10/2009 | Turnbull | H04W 4/029 709/205 |
| 2013/0055370 A1* | 2/2013 | Goldberg | G06F 21/31 726/7 |
| 2013/0082819 A1* | 4/2013 | Cotterill | G06F 21/40 340/5.2 |
| 2013/0254288 A1 | 9/2013 | Harrison | |
| 2014/0259129 A1* | 9/2014 | Copsey | G06F 21/35 726/5 |
| 2014/0331278 A1* | 11/2014 | Tkachev | H04L 63/08 726/1 |
| 2015/0006695 A1 | 1/2015 | Gupta | |
| 2015/0128240 A1* | 5/2015 | Richards | H04W 12/068 726/7 |
| 2015/0229650 A1* | 8/2015 | Grigg | H04L 63/107 726/7 |
| 2016/0142420 A1 | 5/2016 | Gupta et al. | |
| 2016/0196414 A1* | 7/2016 | Stuntebeck | G01P 13/00 726/17 |
| 2017/0105171 A1* | 4/2017 | Srivastava | H04L 63/0245 |
| 2017/0195318 A1 | 7/2017 | Liu et al. | |
| 2017/0372270 A1 | 12/2017 | Ziskind et al. | |
| 2018/0041518 A1* | 2/2018 | Jacobs | H04L 63/107 |
| 2018/0103039 A1 | 4/2018 | Thaler | |
| 2018/0288130 A1* | 10/2018 | Sandfort | H04L 67/51 |
| 2020/0117690 A1* | 4/2020 | Tran | G06F 16/90332 |
| 2020/0236116 A1* | 7/2020 | Bower | G06K 19/0723 |
| 2021/0084494 A1* | 3/2021 | Angelov | H04W 12/08 |

OTHER PUBLICATIONS

A. Chatterjee, J. Chen, M. Perez, E. Tapia and J. Tsan, "Energy efficient framework for health monitoring using mobile systems," 2017 2nd International Conference for Convergence in Technology (I2CT), 2017 (Year: 2017).*

Mell et al., "The NIST Definition of Cloud Computing", Recommendations of the National Institute of Standards and Technology, NIST Special Publication 800-145, Sep. 2011, 7 pages.

Apple, "Families", printed May 1, 2020, 25 pages, https://www.apple.com/families/.

Kidlox, "Less Screen Time More Family Time", Effectively Limit Child Screen Time With Parental Control App, printed May 1, 2020, 9 pages, https://kidslox.com/.

* cited by examiner

SYSTEM TO CONTROL ACCESS TO WEB RESOURCES BASED ON AN INTERNET OF THINGS AUTHORIZATION MECHANISM

BACKGROUND

The present invention relates, generally, to the field of computing, and more particularly to the Internet of Things.

The Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

SUMMARY

According to one embodiment, a method, computer system, and computer program product for managing access to one or more protected web resources based on the location of an approver is provided. The present invention may include granting the requestor access to the protected web resource based on one or more access requirements being met, wherein at least one access requirement comprises a location of one or more authorization devices corresponding with one or more approvers being within a threshold distance of a computing device of a requestor requesting a protected web resource.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
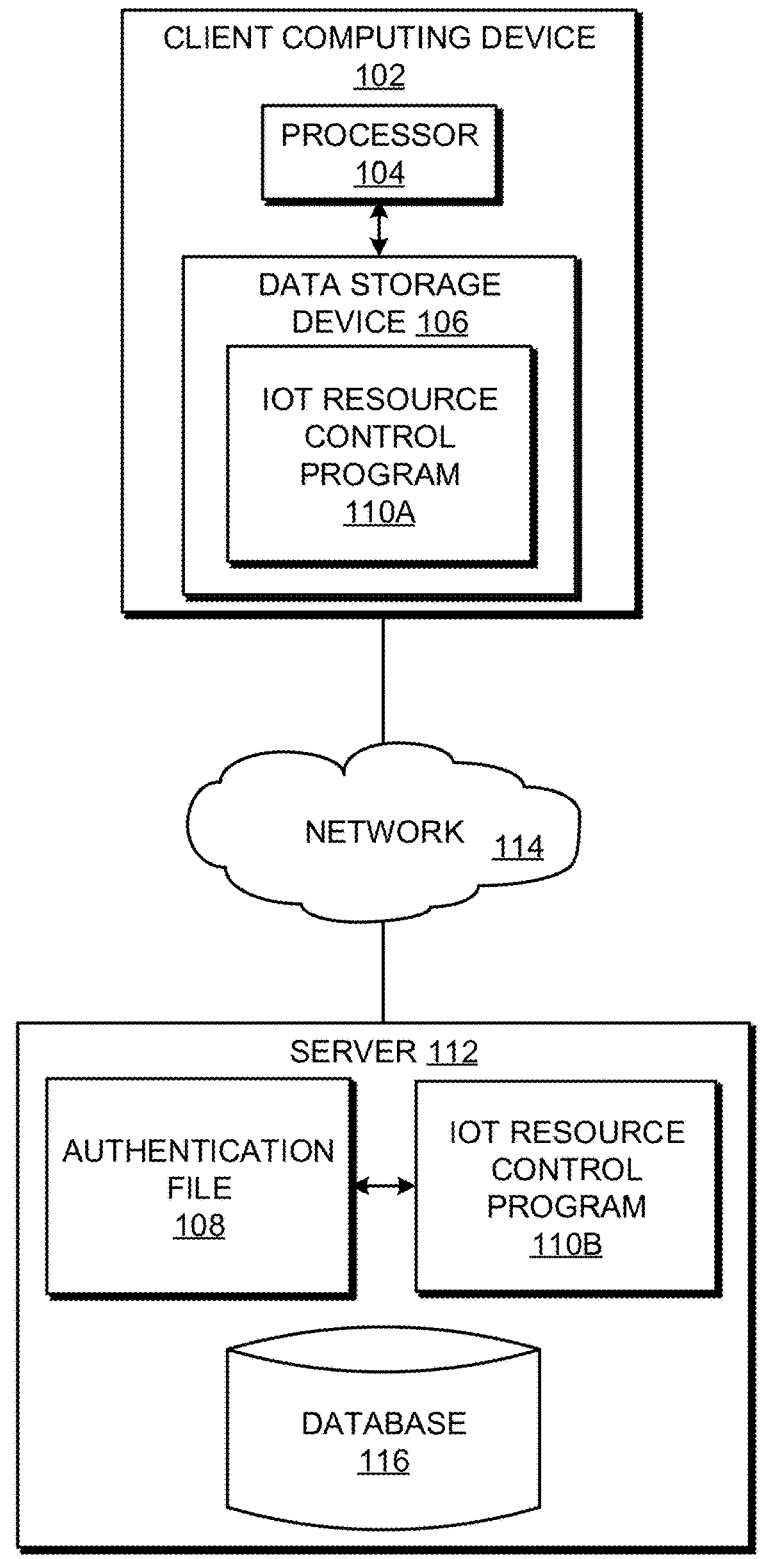
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the Internet of Things. The following described exemplary embodiments provide a system, method, and program product to, among other things, managing access to protected web resources based on the relative geographic position of mobile devices belonging to an authorized person. Therefore, the present embodiment has the capacity to improve the technical field of the Internet of Things as well as digital security by leveraging networking technologies and the widespread proliferation of networked computing devices to improve protections for web resources by preventing access unless individuals capable of providing approval are physically present.

As previously described, the Internet of Things (IoT) is a collection of devices such as vehicles, home appliances, computers, mobile devices, sensors, and any real-world object embedded with networking technology which are capable of connecting, interacting, and exchanging data with each other over a network. IoT technology allows multiple devices to work together and accomplish tasks or provide information far beyond the capabilities of each individual device. As IoT technologies have evolved, they have revolutionized such fields as home automation, manufacturing, agriculture, transportation, medicine, healthcare, energy management and more. Wherever there are two or more connected devices, IoT technology may be harnessed to solve problems.

With the rise of digital networking and the population of networks with documents, videos, images, and all sorts of other data, there inevitably comes a need to restrict some users' ability to access data, whether to protect against theft, manage childrens' access to distracting or inappropriate material, et cetera. In some cases, this is best achieved by restricting access to a web resource unless a certain individual is physically present. For example, parents might only want children watching videos or playing games online while a family member is present to supervise them, to ensure that they do not encounter inappropriate content or to enforce limits on playtime. In another example, sensitive documents for a company may be access restricted unless a representative of the company is present to visually verify that the document is accessed by authorized individuals and is not downloaded, copied, or tampered with. Or, in another example, an artist may only desire others to access her incomplete digital art pieces while she is present, so that she can indicate the unfinished elements and mitigate a potentially disappointed viewer reaction. However, even insofar as current means in the art offer solutions to the problem of restricting access to protected web resources, there is very little that leverages IoT devices to utilize physical presence of authorized individuals in managing access to web resources, much less providing multiple levels of security such that a plurality of devices need to provide approval or physical presence to allow access to particularly sensitive documents. Furthermore, existing solutions do not provide contingencies for situations where authorized individuals are required but are not present. As such, it may be advantageous to, among other things, implement a system that employs internet of things (IoT) devices to restrict access to protected web resources based on the physical proximity or absence of approvers, provides a hierarchical access control where a plurality of devices needs to provide approval for the requester to access the resource, utilizes backup and failover mechanisms to provide authentication or access to the web resource when the primary approver device is offline or inaccessible, imposes multi-approval requirements when depending on the resources the system may need approval for more than one device in order to access the resource, and is enabled to perform a plurality of additional security actions in case all approval devices are unavailable.

According to one embodiment, the invention is a method of, in response to a request to access a protected web resource by a requestor, restricting access to the protected web resource unless a mobile device belonging to an authorized individual is within a pre-determined physical proximity.

As described herein, "authorization" may refer to the state of a requestor being allowed access to a protected web resource, and "authorization requirements" may refer to the conditions and/or steps that must be met for a given requestor and/or protected web resource to achieve authorization. "Approvers" may be any individuals capable of granting authorization to access a protected web resource, and may be practically represented to the system by the devices commonly carried on their person, the location of which may correspond with the location of the approver. Such devices are considered "authorization devices."

In some embodiments, the protected web resource may be any resource residing within a network, to which access by at least one individual is restricted. Resources may include documents, data streams, media files, websites, web services, et cetera. In some embodiments, protected web resources may be resources which need to be protected from theft or unauthorized access or dissemination, such as trade secrets, sensitive documents, plans, et cetera. In some embodiments, protected web resources may be web resources which an individual, such as a parent, may deem harmful or undesirable to a requestor or class of requestors; such web resources may include web resources that are known to contain harmful or unwanted content, and/or web resources which are not verified to be free of harmful or unwanted content. In other words, web resources where the content has not been verified.

In some embodiments, web resources may be protected by a hierarchical access control scheme, whereby approvers are stratified according to the level of authorization they are capable of granting to a requestor. In other words, approvers may have relationships to the requestor and/or the protected web content such that one approver may have greater authorization priority, or ability to provide authorization for a requestor to access a protected web resource, than another, and the access control scheme may reflect this by grouping the approvers into different groups based on the approver's relative authorization priority. For example, in a company, a CEO may be a primary approver, capable of granting the highest level of authorization, such that no additional authorization steps may be necessary to grant access to a given protected web resource, by virtue of her high rank in the company. High ranking managers may comprise a layer of secondary approvers, with their immediate subordinates comprising a layer of tertiary approvers, and their immediate subordinates comprising quaternary approvers, et cetera. In the example of a family, the parents could be primary approvers, as parents typically have primary responsibility regarding matters relating to their children, while grandparents could be secondary approvers, babysitters and cousins could be tertiary approvers, et cetera.

In some embodiments of the invention, protected web resources could have multiple authorization requirements depending on the number and/or level of approvers present. For example, a protected web resource may need authorization from only one primary approver, but if no primary approver is nearby, the protected web resource may require authorization from two nearby secondary approvers, or three nearby tertiary approvers. In another example, a protected web resource may require authorization from two primary approvers, but if only one primary approver is nearby, the protected web resource may require authorization from one nearby primary approver and two nearby secondary approvers. In some embodiments, protected web resources may allow an approver to authorize a protected web resource remotely (that is, without being nearby), so long as one or more approvers are nearby.

In some embodiments, the authorization requirements for a given protected web resource may be based on a level of importance or secrecy of a protected web resource. For example, a vital company trade secret may require authorization by the CEO or high-ranking officials to access, while access to company payrolls may be authorized by any member of the finance department. In another example, a video that is known to be inappropriate may have more stringent requirements in allowing a child to access than a video that is questionable but not known to be inappropriate, which may in turn have more stringent access requirements than a video that is known to be safe.

In some embodiments, the authorization requirements required to access a protected web resource may vary based on the requestor. Depending on factors such as the age, rank, disciplinary history, past performance, disposition, occupation, department, which in turn may speak to the risk of the requestor compromising the security of the protected web resource or, for example in the case of children, the risk of being exposed to potentially harmful protected web resources, the authorization requirements may be higher or lower. For example, a child with a recent history of good behavior and of a certain age may be trusted with less stringent authorization requirements to access web resources than a child who is younger or has been behaving irresponsibly. In some embodiments, the level of required authorization may change based on whether the requestor is part of the group to which the protected web resource belongs or is otherwise affiliated with; for example, programmers within a development team may require no authorization to access the code they have developed, but employees from outside the team may require authorization from some approver or combination of approvers to access the code.

In some embodiments, for example where microlocation technology is utilized or where certain distances can be inferred from the range of short-range communications methods such as Bluetooth, the authorization requirements may be based on the distance an approver is from the requestor; a protected web resource may require an approver or combination of approvers to be within a threshold distance of the requestor's device in order to authorize a requestor to access the protected web resource. The threshold distance may be formulated based on the distance at which an approver can see or hear the requestor's device. For example, if the protected web resource is a questionable video, the system may require that an approver be close enough to the requestor's device to see the video before authorizing access to the video, so that the approver can visually verify that the video does not contain any harmful or unwanted content. Where the protected web content is audio, the approver may need to be in earshot of the requested audio. In some embodiments, the location of the approver relative to the screen of the requestor's device may be taken into account for the authorization requirements; the approver may have to be in a position relative to the requestor's device such that the approver can see the media playing on the requestor's device.

In some embodiments, the access requirements may be based on the device associated with the approver. Any number of devices owned by or associated with an approver and often carried on the approver's person, such that the location of the device is likely to correspond with the location of the approver, may be grouped together and collectively associated with that approver. In some embodiments, the system may individually track some or all devices in the group, and infer from a number of factors which devices are currently on the person of the approver and therefore correctly represent the approver's location. These factors may include which devices are currently or recently being interfaced with by a user, whether and what kind of vitality data is being recorded from the approver, accelerometer data, movement data of some devices relative to other devices, et cetera. The system may further infer which devices are not on the person of the approver, and in some embodiments, may disqualify such devices from being considered authorization devices, such that even where such disqualified devices are nearby to a requestor, they cannot provide authorization on behalf of the approver to allow the requestor to access the protected web resource. This may be to prevent, for example, a child from stealing a parent's unattended mobile devices, such as vitality trackers, smartwatches, or mobile phones, and thereby tricking the system into believing that a parent is nearby when he or she is not. In some embodiments, this may be achieved by requiring multiple authorization devices pertaining to a single approver to be nearby before the approver can be considered nearby for purposes of providing authorization to the requestor, or by requiring smaller and more easily misplaced devices, such as vitality trackers, to be accompanied by at least one other device before being considered an authorization device, or, in the event that such a device is the only one nearby, requiring some number of additional authorization steps, such as authorization by a secondary approver.

In some embodiments, for example where an authorization device is a vitality tracker and/or a mobile phone with a vitality tracking app installed, or based on approver preferences, the system may track when an approver is asleep, and may prevent the presence of the approver from authorizing protected web resources for the duration of the time that the approver is asleep.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to managing access to protected web resources based on the relative geographic position of mobile devices belonging to an authorized person.

Referring to FIG. 1, an exemplary networked computer environment 100 is depicted, according to at least one embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run an IoT Resource Control program 110A and communicate with the server 112 via the communication network 114, in accordance with one embodiment of the invention. Client computing device 102 may be, for example, a mobile device, a telephone, a personal digital assistant, a netbook, a laptop computer, a tablet computer, a desktop computer, a vitality tracker, or any type of computing device capable of running a program and accessing a network. As will be discussed with reference to FIG. 4, the client computing device 102 may include internal components 402a and external components 404a, respectively.

A given client computing device 102 may belong in either of two categories; if the client computing device 102 is associated with an approver and/or is often carried near or on the person of the approver, such that the location of the client computing device 102 is likely to correspond with the location of the approver, the client computing device 102 is an authorization device. If the client computing device 102 is owned by or otherwise associated with an approver, and equipped with a user interface sufficient to allow an approver to receive information, for example in the form of text messages, audio alerts, and/or images and/or graphical elements, and to respond to requests or prompts from IoT Resource Control program 110A, 110B, the client computing device 102 may be considered a notification device. Often, a client computing device 102 may be both a notification device and an authorization device, for example where the client computing device is a cell phone or tablet. However, in some instances a client computing device 102 is only a notification device, for example where client computing device 102 is a laptop where the approver prefers to read and respond to messages, but which is not carried on the approver's person. Conversely, a client computing device 102 that is a vitality tracker may be carried on an approver's person but is not equipped with a user interface sufficient to allow a user to interact with IoT Resource Control program 110A, 110B. Any number of client computing devices 102 may be associated with a given approver.

The server computer 112 may be a laptop computer, netbook computer, personal computer (PC), a desktop computer, or any programmable electronic device or any network of programmable electronic devices capable of hosting and running a IoT Resource Control program 110B and a database 116 and communicating with the client computing device 102 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

Authentication file 108 may be a digital document comprising a list of protected web resources to which access is restricted, and may further comprise a list of individuals, herein referred to as requestors, who require authorization before they can be allowed to access a given protected web resource. Authentication file 108 may further include code, such as a list of network ports, which enables IoT Resource Control program 110A, 110B to block the protected web resources from being accessed by a requestor until authorization has been approved. Authentication file 108 may further comprise the authorization requirements, or the rules and steps by which authorization must be approved, with respect to each protected web resource and/or requestor and/or client computing device 102. Authentication file 108 may be pre-provided, and/or may be edited or updated by approvers over time.

According to the present embodiment, the IoT Resource Control program 110A, 110B may be a program capable of managing access to protected web resources based on the relative geographic position of mobile devices belonging to an authorized person. The IoT Resource Control program 110A, 110B may be located on client computing device 102 or server 112 or on any other device located within network 114. Furthermore, IoT Resource Control program 110A, 110B may be distributed in its operation over multiple devices, such as client computing device 102 and server 112. The IoT resource control method is explained in further detail below with respect to FIG. 2.

Figure 2:
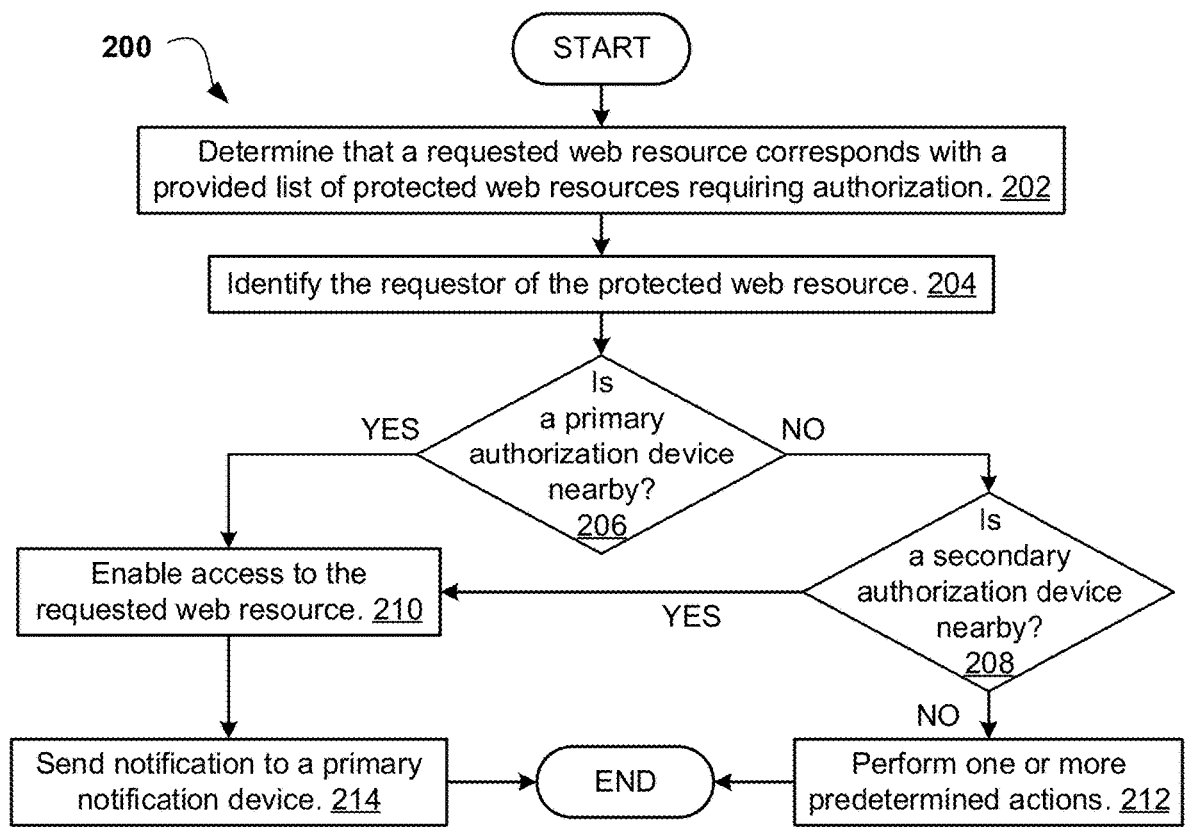
FIG. 2 is an operational flowchart illustrating an IoT resource control process according to at least one embodiment.

Referring now to FIG. 2, an operational flowchart illustrating a IoT resource control process 200 is depicted according to at least one embodiment. At 202, the IoT Resource Control program 110A, 110B determines that a requested web resource corresponds with a provided list of protected web resources requiring authorization. The list of protected web resources requiring authorization may be part of or included in authentication file 108. The IoT Resource Control program 110A, 110B may make the determination by comparing the requested web resource against a pre-supplied list of web resources which require authorization, and if it is a match, the requested web resource is a protected web resource which requires authorization. In some embodiments, the list or authentication file 108 may further include the type of authorization required for each given protected web resource, and/or for each listed requestor.

At 204, the IoT Resource Control program 110A, 110B identifies the requestor of one or more protected web resources. IoT Resource Control program 110A, 110B may identify the requestor by requesting a biometric scan and/or identifier and/or username and/or password uniquely corresponding to the requestor be entered when the computer is booted up, at the beginning of a web browsing session, upon request of the web resource, or at any other time. In some embodiments, a given device may be associated with a requestor such that any requests from that device are inferred to come from the requestor.

At 206, the IoT Resource Control program 110A, 110B determines whether a primary authorization device is nearby. The IoT Resource Control program 110A, 110B may make this determination by utilizing available short-range wireless communications methods to identify devices within the geographical proximity of the requestor's device. In some embodiments, for example where location or microlocation data of a device is available, proximity may be a pre-determined threshold distance from the requestor's device, which may, for example, represent a distance at which an approver can supervise consumption of the web resource by the requestor, or may represent a distance at which an approver can hear the requestor and/or audio components of the web resource. Proximity may in some embodiments be inferred by a device's connection to the same short-range wireless communications network, such as a Bluetooth or Wi-Fi network, as the requestor's device. In some embodiments, proximity may be determined by exchange of short-range communications, such as ultrasound, Bluetooth, et cetera, directly between the requestor's device and another device.

IoT Resource Control program 110A, 110B may identify nearby devices, such as by requesting identification information from the nearby devices, and matching the identified devices against a list of primary authorization devices to determine if an identified nearby device is a primary authorization device for the requested protected web resource. The list of primary authorization devices for a given protected web resource may or may not be part of or provided with authentication file 108. Primary authorization devices may be devices belonging to and/or often on the person of a primary approver, such that IoT Resource Control program 110A, 110B may infer that the location of the primary authorization device corresponds with the location of the primary approver. A primary approver may be an individual who is given priority in approving access to a protected web resource for a given requestor. For example, where the requestor is a child, the primary approver may be his or her parents. Where the requestor is an employee, the primary approver may be his or her boss or a high-ranking company representative. According to one implementation, if the IoT Resource Control program 110A, 110B determines that a primary authorization device is nearby (step 206, "YES" branch), the IoT Resource Control program 110A, 110B may continue to step 210 to enable access to the requested web resource. If the IoT Resource Control program 110A, 110B determines that no primary authorization devices are nearby (step 206, "NO" branch), the IoT Resource Control program 110A, 110B may continue to step 208 to determine whether a secondary authorization device is nearby.

At 208, the IoT Resource Control program 110A, 110B determines whether a secondary authorization device is nearby. The IoT Resource Control program 110A, 110B may make this determination by utilizing available short-range wireless communications methods to identify devices within the geographical proximity of the requestor's device. IoT Resource Control program 110A, 110B may identify nearby devices, or consult a list of devices that have already been identified in the previous step, and match the identified devices against a list of secondary authorization devices to determine if an identified nearby device is a secondary authorization device for the requested protected web resource. The list of secondary authorization devices for a given protected web resource may or may not be part of or provided with authentication file 108. The secondary authorization devices may be devices belonging to, associated with, and/or often on the person of a secondary approver, such that IoT Resource Control program 110A, 110B may infer that the location of the secondary authorization device corresponds with the location of the secondary approver. A secondary approver may be an individual who may approving access to a protected web resource for a given requestor, but who is given lower priority than a primary approver. For example, where the requestor is a child, the secondary approver may be his or her nanny, or babysitter, or cousin. Where the requestor is an employee, the secondary approver may be his or her fellow employee. According to one implementation, if the IoT Resource Control program 110A, 110B determines that a secondary authorization device is nearby (step 208, "YES" branch), the IoT Resource Control program 110A, 110B may continue to step 210 to enable access to the requested web resource. If the IoT Resource Control program 110A, 110B determines that no secondary authorization devices are nearby (step 208, "NO" branch), the IoT Resource Control program 110A, 110B may continue to step 212 to perform one or more predetermined actions.

At 210, IoT Resource Control program 110A, 110B may enable access to the requested web resource. In some embodiments, IoT Resource Control program 110A, 110B may be provided with an authentication file 108, which may contain code which will block network connections from the computer to certain web resources. IoT Resource Control program 110A, 110B may disable the code or otherwise unblock the corresponding protected web resource in response to determining that authorization has been achieved. In some embodiments, once authorized, the protected web resource may remain available to the requestor for the duration of the requestor's browsing session, for example until the requestor quits out of their web browser, logs off of their session or device, or powers down their device. In other embodiments, the protected web resource may remain available for a predetermined period of time, or may remain available only so long as an approver or some combination of approvers are nearby.

At 212, IoT Resource Control program 110A, 110B performs one or more predetermined actions. The predetermined actions may be a list of actions available to maintain protection of the protected web resources in the event that no approvers are available to approve or deny the request for a protected web resource. The actions may include messaging all approvers or all primary approvers with available data regarding the request, such as the identity of the requestor, the time and date of the request, the protected web resource requested, et cetera. In some embodiments, for example where the protected web resource is low security, one or more approvers may be given the option to approve access to the web resource remotely. The predetermined actions may further include disconnecting the device from which the request originated from the network, disconnecting all of the requestor's devices including the device from which the request originated from the network, disconnecting any device on which the requestor logs in or otherwise identifies herself from the network, block the requestor from one or more predetermined web services, et cetera. Ongoing actions, such as blocking connectivity, may last for a predetermined duration, or until one or more primary approvers, one or more secondary approvers, or some combination of approvers, approves the original request or opts to end the ongoing predetermined action or actions.

At 214, IoT Resource Control program 110A, 110B sends a notification to a primary notification device. IoT Resource Control program 110A, 110B may send notifications to the primary notification device to apprise the primary approver or approvers of the request and/or the request's successful resolution, and may further comprise available data regarding the request, such as the identity of the requestor, the time and date of the request, the protected web resource requested, et cetera.

Figure 3:
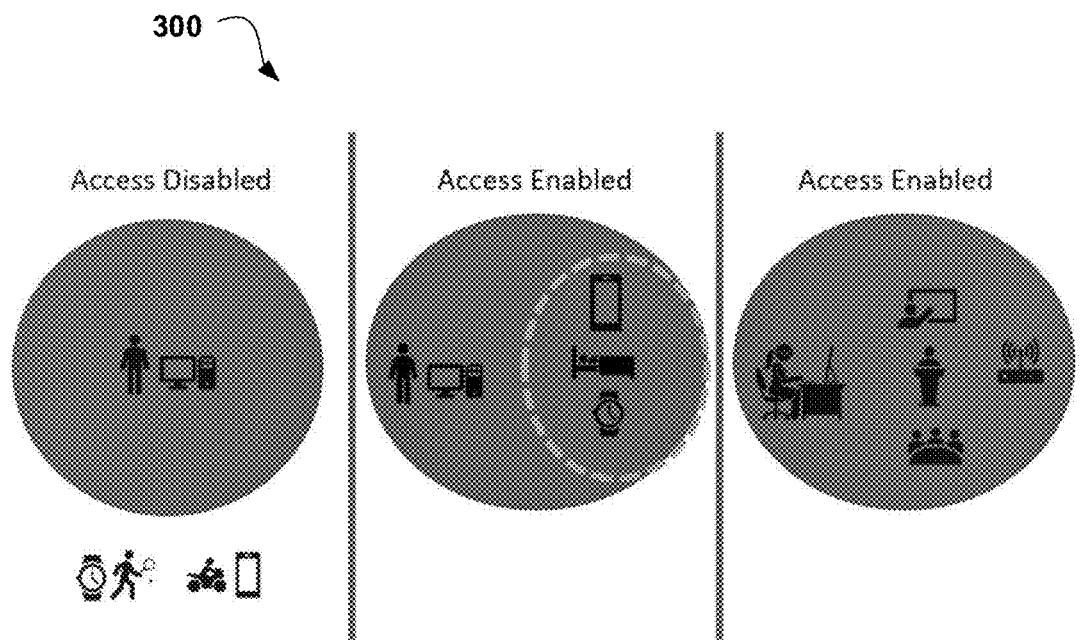
FIG. 3 is an illustration of multiple authorization states of an IoT resource control process according to at least one embodiment.

With regard to FIG. 3, an illustration of multiple authorization states 300 of an IoT resource control process 200 is depicted according to at least one embodiment. The first panel depicts a case where access to a protected web resource is disabled by IoT Resource Control program 110A, 110B where approvers are outside of the proximity of the requestor. Here, the requestor's location is represented by the location of the requestor's device, a desktop computer, and the approvers' locations are respectively represented by the locations of their authorization devices, a smart watch and a mobile phone, respectively. In the next panel, access to a protected web resource is enabled by IoT Resource Control program 110A, 110B because the requestor, or at least the requestor's device, a desktop computer, is within the proximity of an approver as evidenced by the presence of the approver's smartwatch and phone. In the third panel, access to a protected web resource is enabled by IoT Resource Control program 110A, 110B because the requestor, or at least the requestor's device, a desktop computer, is within the proximity of an approver as evidenced by the presence of the approver's smartboard, conferencing equipment, and wireless device.

It may be appreciated that FIG. 2-3 provides only a illustrations of one implementation and do not imply any limitations with regard to how different embodiments may be implemented. Many modifications to the depicted environments may be made based on design and implementation requirements. For example, while FIG. 2 depicts a hierarchical authorization scheme divided into primary and secondary approvers for the sake of simplicity, one of ordinary skill in the art would understand that any hierarchical scheme comprising any number of gradations may be employed. For instance, in the example of a large corporation, where a very granular authorization scheme may be needed to protect numerous web resources subject to complex access requirements, there may be tertiary approvers, quaternary approvers, and so on, where perhaps each web resource requires a combination of approvers based on access requirements and confidentiality concerns.

Figure 4:
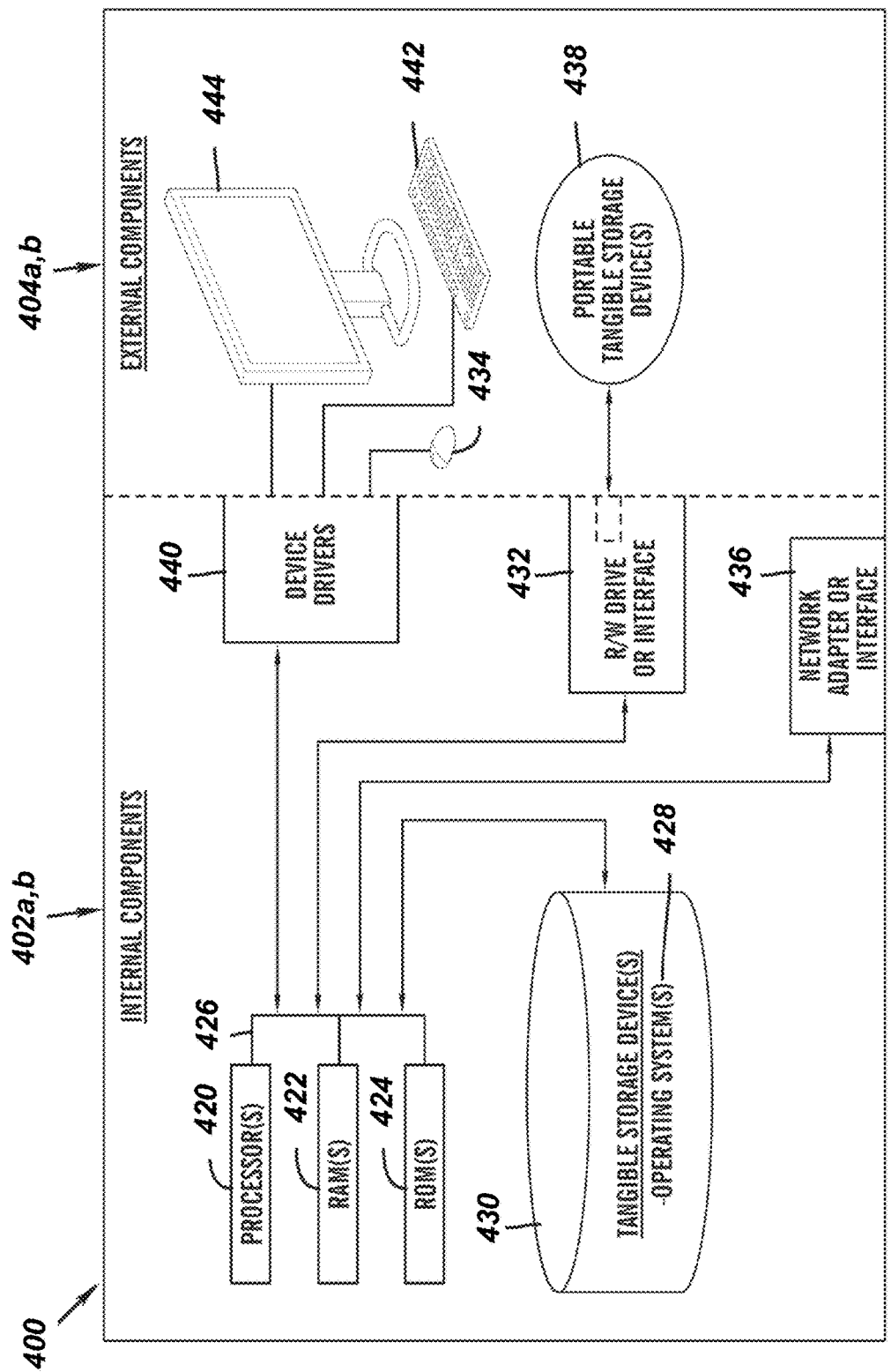
FIG. 4 is a block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 *a,b* and external components 404 *a,b* illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the IoT Resource Control program 110A in the client computing device 102, and the IoT Resource Control program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the IoT Resource Control program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The IoT Resource Control program 110A in the client computing device 102 and the IoT Resource Control program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the IoT Resource Control program 110A in the client computing device 102 and the IoT Resource Control program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
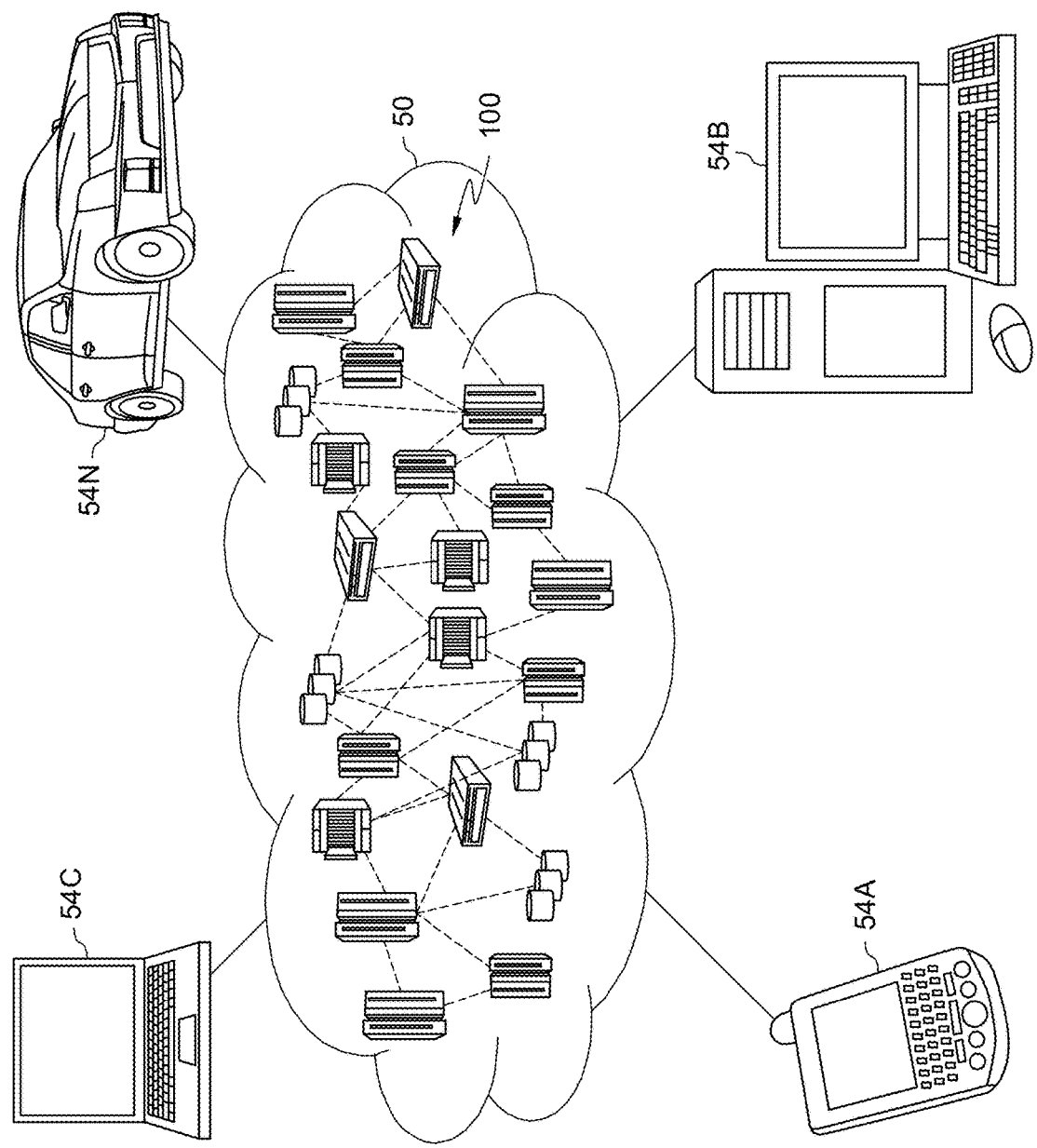
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
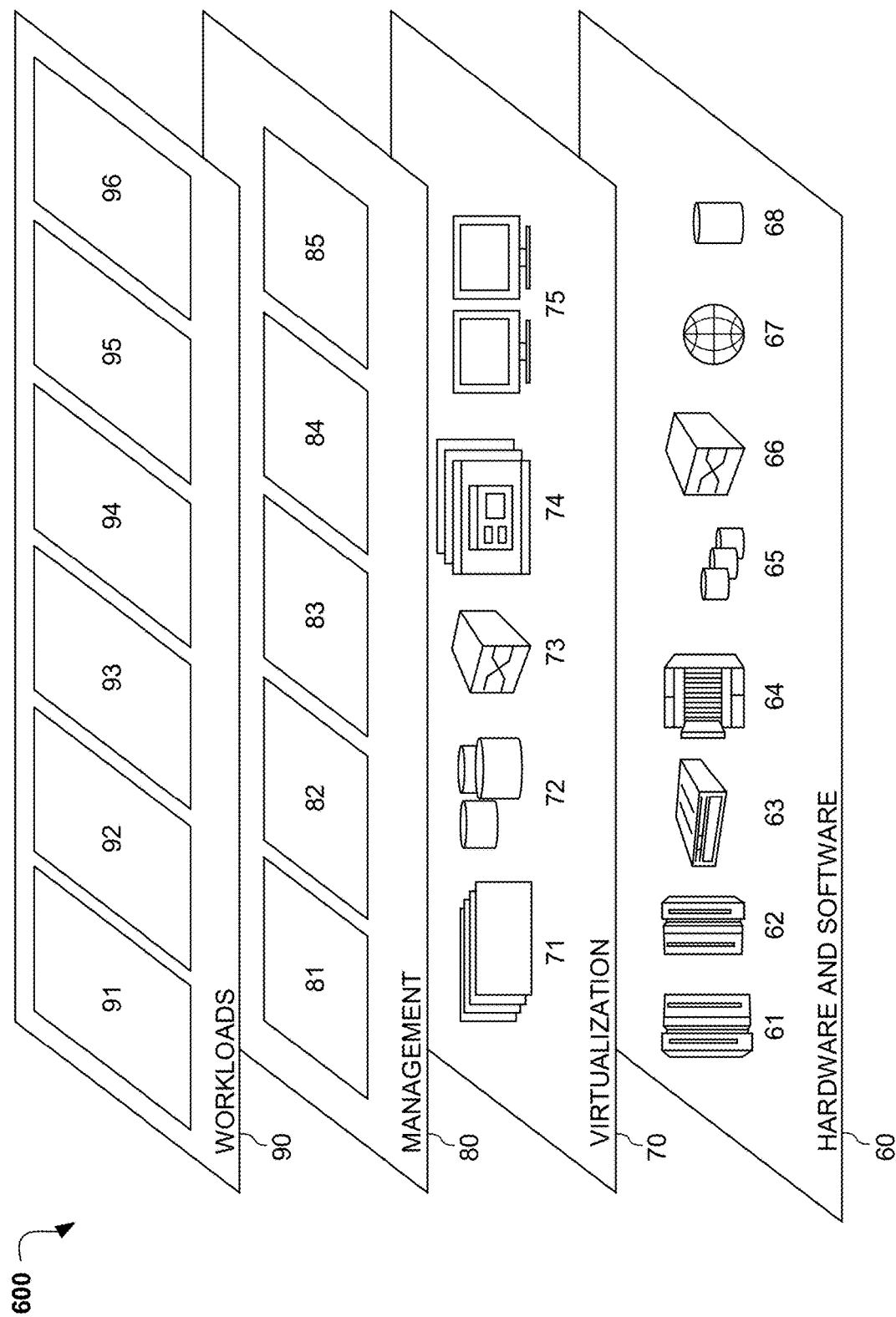
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and IoT resource control 96. IoT Resource Control 96 may relate to managing access to protected web resources based on the relative geographic position of mobile devices belonging to an authorized person.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for managing access to one or more protected web resources based on the location of an approver, the method comprising:
   receiving, by an IoT resource control program, a request from a requestor to access a protected web resource;
   collecting, by the IoT resource control program, accelerometer data and a movement of one or more mobile devices relative to each other from the one or more mobile devices;
   determining, by the IoT resource control program, that a plurality of the mobile devices are on a person of one or more approvers based on accelerometer data based on the accelerometer data and the movement;
   responsive to the determining, identifying by the IoT resource control program, the plurality of mobile devices on the person of the one or more approvers as authorization devices;
   identifying by the IoT resource control program, a location of the one or more authorization devices corresponding with the one or more approvers as within a threshold distance of a computing device of a requestor; and
   granting, by the IoT resource control program, the requestor access to the protected web resource based on the identifying.

2. The method of claim 1, wherein the one or more approvers are stratified into at least two groups according to authorization priority, wherein a first group has higher authorization priority than a second group.

3. The method of claim 2, further comprising:
   responsive to determining that no authorization devices corresponding with one or more approvers within a group of higher authorization of the at least two groups are within the threshold distance of the computing device of the requestor, granting the requestor access to the protected web resource based on a location of one or more authorization devices corresponding with one or more approvers within a group of lower authorization of the at least two groups being within the threshold distance of the computing device of the requestor.

4. The method of claim 1, responsive to determining that no authorization devices corresponding with one or more approvers are within the threshold distance of the computing device of the requestor, performing one or more predetermined actions.

5. The method of claim 1, wherein the authorization requirements are based on factors pertaining to the requestor and an importance of the protected web resource.

6. A computer system for managing access to one or more protected web resources based on the location of an approver, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving, by an IoT resource control program, a request from a requestor to access a protected web resource;
collecting, by the IoT resource control program, accelerometer data and a movement of one or more mobile devices relative to each other from the one or more mobile devices;
determining, by the IoT resource control program, that a plurality of the mobile devices are on a person of one or more approvers based on accelerometer data based on the accelerometer data and the movement;
responsive to the determining, identifying by the IoT resource control program, the plurality of mobile devices on the person of the one or more approvers as authorization devices;
identifying by the IoT resource control program, a location of the one or more authorization devices corresponding with the one or more approvers as within a threshold distance of a computing device of a requestor; and
granting, by the IoT resource control program, the requestor access to the protected web resource based on the identifying.

7. The computer system of claim 6, wherein the one or more approvers are stratified into at least two groups according to authorization priority, wherein a first group has higher authorization priority than a second group.

8. The computer system of claim 7, further comprising:
responsive to determining that no authorization devices corresponding with one or more approvers within a group of higher authorization of the at least two groups are within the threshold distance of the computing device of the requestor, granting the requestor access to the protected web resource based on a location of one or more authorization devices corresponding with one or more approvers within a group of lower authorization of the at least two groups being within the threshold distance of the computing device of the requestor.

9. The computer system of claim 6, responsive to determining that no authorization devices corresponding with one or more approvers are within the threshold distance of the computing device of the requestor, performing one or more predetermined actions.

10. The computer system of claim 6, wherein the authorization requirements are based on factors pertaining to the requestor and an importance of the protected web resource.

11. A computer program product for managing access to one or more protected web resources based on the location of an approver, the computer program product comprising:
one or more computer-readable tangible storage medium and program instructions stored on at least one of the one or more tangible storage medium, the program instructions executable by a processor to cause the processor to perform a method comprising:
receiving, by an IoT resource control program, a request from a requestor to access a protected web resource;
collecting, by the IoT resource control program, accelerometer data and a movement of one or more mobile devices relative to each other from the one or more mobile devices;
determining, by the IoT resource control program, that a plurality of the mobile devices are on a person of one or more approvers based on accelerometer data based on the accelerometer data and the movement;
responsive to the determining, identifying by the IoT resource control program, the plurality of mobile devices on the person of the one or more approvers as authorization devices;
identifying by the IoT resource control program, a location of the one or more authorization devices corresponding with the one or more approvers as within a threshold distance of a computing device of a requestor; and
granting, by the IoT resource control program, the requestor access to the protected web resource based on the identifying.

12. The computer program product of claim 11, wherein the one or more approvers are stratified into at least two groups according to authorization priority, wherein a first group has higher authorization priority than a second group.

13. The computer program product of claim 12, further comprising:
responsive to determining that no authorization devices corresponding with one or more approvers within a group of higher authorization of the at least two groups are within the threshold distance of the computing device of the requestor, granting the requestor access to the protected web resource based on a location of one or more authorization devices corresponding with one or more approvers within a group of lower authorization of the at least two groups being within the threshold distance of the computing device of the requestor.

14. The computer program product of claim 11, responsive to determining that no authorization devices corresponding with one or more approvers are within the threshold distance of the computing device of the requestor, performing one or more predetermined actions.

* * * * *